Figure 1:
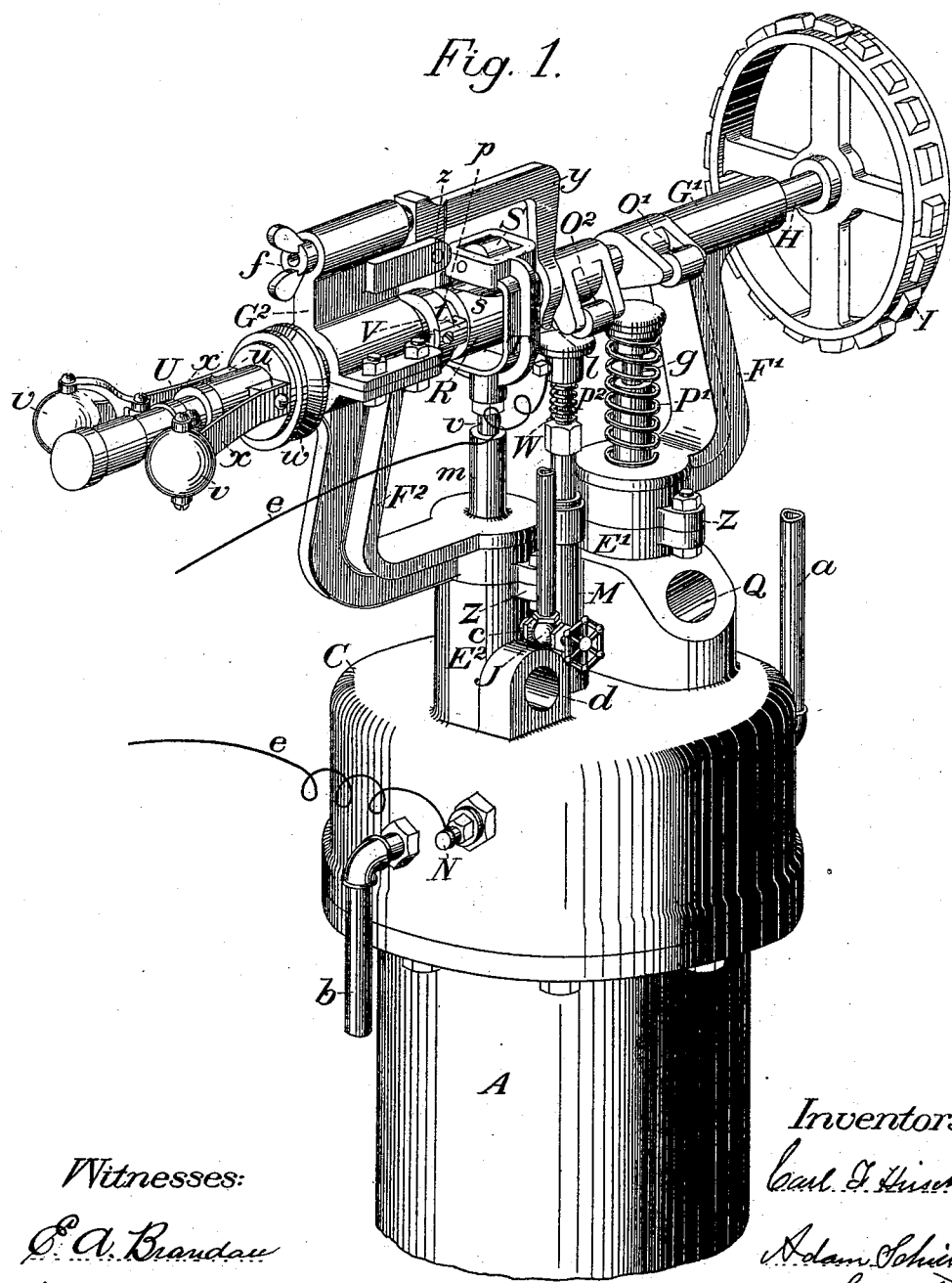

(No Model.) 2 Sheets—Sheet 1.

C. F. HIRSCH & A. SCHILLING.
GAS ENGINE.

No. 507,436. Patented Oct. 24, 1893.

Witnesses:
E. A. Brandau
G. W. Sullivan

Inventors:
Carl F. Hirsch
Adam Schilling
by their Atty
John Richards

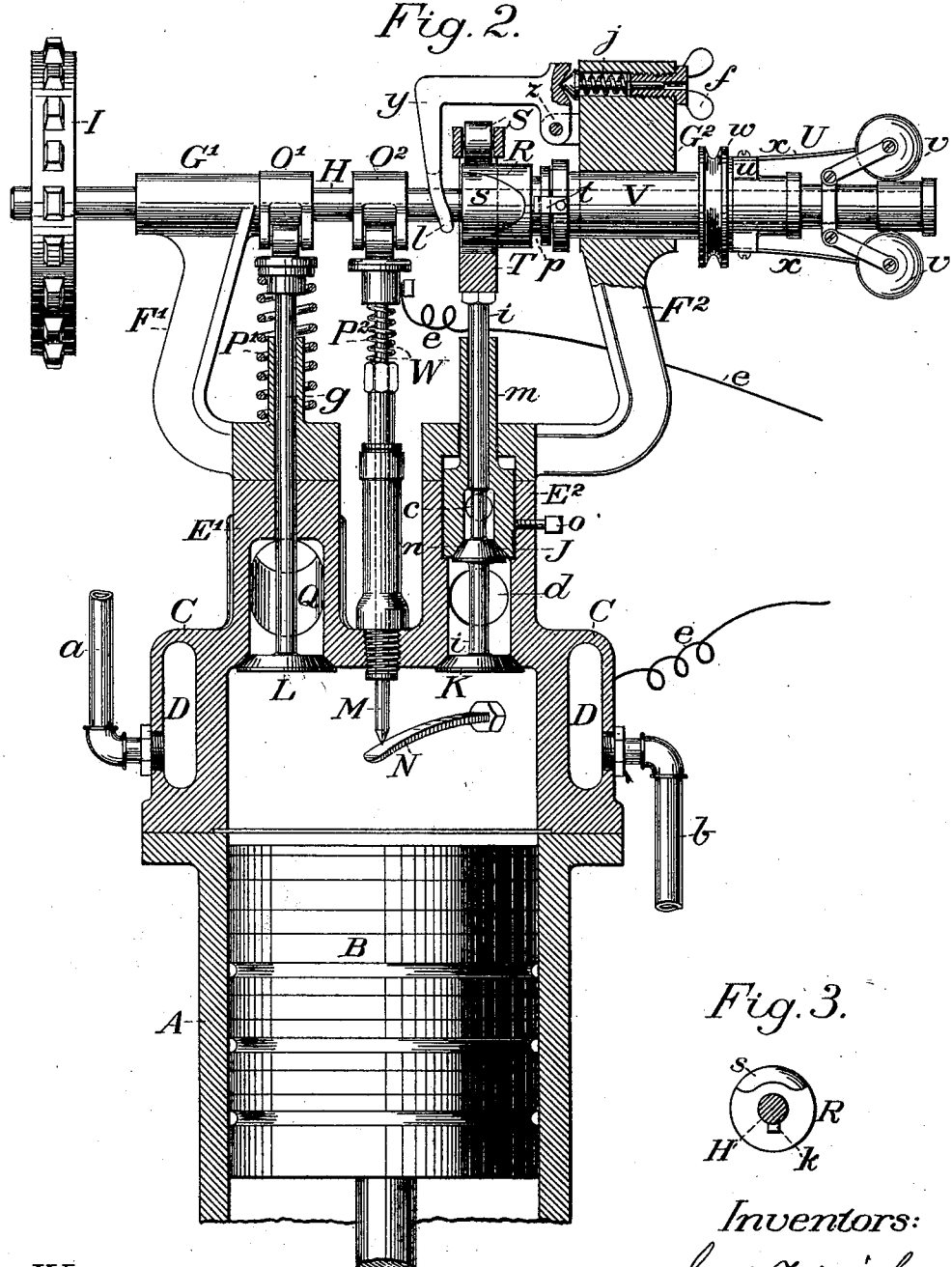

UNITED STATES PATENT OFFICE.

CARL F. HIRSCH AND ADAM SCHILLING, OF SAN FRANCISCO, CALIFORNIA.

GAS-ENGINE.

SPECIFICATION forming part of Letters Patent No. 507,436, dated October 24, 1893.

Application filed August 5, 1891. Renewed September 20, 1893. Serial No. 486,031. (No model.)

*To all whom it may concern:*

Be it known that we, CARL F. HIRSCH and ADAM SCHILLING, citizens of the United States, residing in the city and county of San Francisco, State of California, have invented certain new and useful Improvements in Gas-Engines; and we hereby declare the following specification and drawings accompanying the same to be a full, clear, and exact description of our invention.

This invention relates to motive engines impelled by explosive gases, and to mechanism for regulating the charges of explosive gas, igniting the same and expelling the unburned residuum.

Our invention consists in mounting above and transverse to, the axis of the cylinder of a gas engine, a rotating shaft performing the various functions required in the engine's operation, namely: the induction of gas and air combined at proper intervals; holding the induction valves closed, so that no gas or air can enter the cylinder when not required; igniting the charge by means of electrical apparatus at the proper time, and opening the exhaust valve at alternate revolutions of the engine to permit the escape of spent or burned gases from the engine.

Our invention also consists in regulating mechanism to admit a variable quantity of air and gas as the speed and power required may demand.

Referring to the drawings: Figure 1 is a perspective view of the upper portion of the cylinder of a gas engine and combustion chamber thereon, fitted with our improvements. Fig. 2 is a reverse view, partially in section, taken vertically through the center of Fig. 1, and Fig. 3 is a detail showing an end view of the cam for operating the induction valves of the engine.

Similar letters of reference on the different figures of the drawings indicate corresponding parts.

In the drawings A is a section of the main cylinder of a gas engine and B the piston, which is connected to the crank in the usual manner.

On top of the cylinder A is bolted the combustion chamber C, to which is attached the various operating parts forming the subject of our invention.

The combustion chamber C has an annular passage D formed around it, through which water is circulated to prevent excessive heat, arising from the combustion of the impelling gases. Water enters the chamber D by the pipe $a$ and escapes at the pipe $b$, or the reverse, as the head and discharge may determine.

On the top of the chamber C are formed two hollow nipples $E'$ and $E^2$, to the top of which are attached the brackets $F'$ and $F^2$ held by the lugs and bolts Z, Fig. 1. In these brackets $F'$ and $F^2$, are formed bearings $G'$ and $G^2$, in which is supported the shaft H, driven by a pitch chain passing around the pulley I or by any other suitable mechanism for connecting to the crank shaft of the engine, that will produce positive rotation of the shaft H at one-half the speed of the engine crank shaft. This difference of speed between the shaft H and the engine crank shaft is required, because the functions performed by the shaft H relate and apply to alternate revolutions of the engine; one stroke of the piston B being required to expel the spent gases after each impulse or explosion.

The valve J is to admit gas which enters at $c$ and may be carbureted hydrogen, or the vapor of hydro-carbons, such as naphtha or its distilled product, the requirements being, an explosive mixture when mingled with air, which enters through the aperture $d$ and the valve K simultaneous with the gas at $c$ and J.

The exhaust valve L is to permit the escape of spent gas which, after passing through this valve L is exhausted through aperture Q and a waste pipe attached at that point.

M and N are electrodes connecting with opposite poles of an electric battery, by means of wires $e\ e$, and giving out an electric spark when separated, thus firing or igniting the charge of gas contained in the chamber C, after the charge has been compressed by each alternate upward movement of the piston B.

The shaft H contains two cams or tappets $O'$ and $O^2$; the one $O'$ operating the exhaust valve L and the other $O^2$, operating the electrode M as shown in the drawings. The stem $g$ of the exhaust valve L and the stem W of the electrode M, when released by the cams O' and O² are raised instantly by coil springs P' and P².

The induction valves J and K, for gas and air, are both mounted on one stem $i$, which slides in the sleeve $m$, formed integrally with the valve seat $n$, of the valve J. The sleeve $m$ is made to move slightly up and down in the nipple E² so as to adjust the seats of the valves J and K relatively and keep them tight in case of wear; a set screw $o$ being provided to keep the valve seat and sleeve $m$ in place after adjustment. These valves J and K, are made so that their respective areas will admit the proper amount of air and gas.

To operate the induction valves J and K, we employ a cam R, shown in end view at Fig. 3. This cam R is attached to and revolves with the shaft H by means of a feather key $k$, and has a section $s$ cut away on its exterior, tapering from the inner end, so that the roller S, yoke T, and stem $i$ will drop down whenever the roller S comes to the depression or cut away portion $s$, and to a distance varying with the longitudinal position of the cam R on the shaft H, or as the roller may be nearer to the outer or inner end of the cam R. If this cam R is in the position shown in Fig. 2, and the roller S near its end, then the yoke T, stem $i$, and valves J and K will drop so as to admit a full charge of air and gas. On the other hand if the cam R is moved endwise until the roller S is at the other or outer end, where the cut away portion ends, the roller S and stem $i$ will be held up continually and the induction valves J and K, remain closed so that no air or gas can be admitted. When the roller S is resting on the extreme or complete periphery of the cam R no downward movement of the stem $i$ is possible. In this manner the valves J and K are held shut except during the time the roller S is on the cut away portion $s$ of the cam R, and, as before pointed out, no gas or air can enter the chamber C, except at proper intervals, thus avoiding the danger of back, or premature, explosions. It will also be seen regulation is performed between the two points of adjustment of the cam R which slides freely on the shaft H, the roller S, yoke T and stem $i$ dropping in proportion as the cam R is moved forward or back by means of the governor U in the following manner: On the shaft H and sliding within the bearing G² is a shell or sleeve V, to the inner end of which is attached hooks $t$ entering a groove $p$ on the cam R so that the cam and sleeve, although revolving at different speeds, move together freely on the shaft H, the sleeve V sliding through the bearing G². The sleeve V is formed with a pulley $w$ on its outer end, also with extensions $u$ $u$, to which are attached the weights $v$ $v$, of the governor U, by means of the springs or links $x$ $x$. The governor U is driven by a band on the pulley $w$, connected to a suitable driving pulley on the engine shaft below, so that the governor will be driven at the required speed, independent of that of the shaft H, on which the governor U has its bearing. If the engine increases in speed the governor balls $v$ $v$ are thrown by centrifugal force out from the center, the springs or links $x$ $x$, moving the sleeve V forward through the bearing G² and sliding the cam R on the shaft H accordingly; so that the movements of the yoke T, stem $i$, and valves J and K, will be as the speed at which the governor U is driven, or as the position of the cam R on the shaft H relatively to the roller S, thus supplying at all times the exact amount of gas required to perform the work required, and as the resistance to the engine. In this manner it will be seen, the range of movement for the valves J and K, will depend upon the action of the governor U, accomplishing complete regulation of the speed and power of the engine.

To adjust the action of the governor U and the speed at which the engine is maintained, we employ a bell crank $y$, hinged at $z$, and operated by a thumb screw $f$ and spring $j$, so that the point $l$, of the crank $y$ will press against the inner end of the cam R and thus expose the action of the weights $v$ $v$ and springs $x$ $x$. In this manner the position of weights $v$ $v$, and consequently of the cam R, will be altered with relation to the speed of the engine in the same degree that pressure is applied by the thumb screw $f$ and by the bell crank $y$.

In this arrangement of a gas engine it may be seen that all of its operating parts, in so far as the supply, distribution and ignition of the propelling fluid are concerned are performed by the rotation of a single shaft set parallel with and driven directly from the crank shaft of the engine; also that one shaft can perform the required functions for two or more cylinders set in one line, the tappets and other details being arranged in proper sequence and corresponding to the respective position of the crank.

Having thus described the nature and objects of our improvements in gas-engines and the manner of constructing and applying the same, what we claim as new, and desire to secure by Letters Patent, is—

1. In a gas engine, a superimposed shaft mounted on the main cylinder thereof, connected to and positively driven by the engine crank shaft and provided with tappets to operate induction and eduction valves, electric igniting apparatus, also with governing mechanism to regulate the admission of air and gas, said mechanism consisting essentially of a sliding cam on the superimposed shaft and a yoke surrounding said cam, all combined and operating substantially in the manner and for the purposes set forth.

2. In a gas engine, a superimposed shaft provided with a sliding cam thereon to operate the admission valves for air and gas, the cam surrounded by a yoke and so arranged as to produce a positive closing movement of the admission valves also holding them shut when no gas and air are to be admitted substantially in the manner and for the purposes set forth.

3. In a gas engine, a superimposed shaft mounted thereon, connected to and driven positively by the engine crank shaft, a movable cam thereon for operating the admission valves for air and gas, a yoke embracing the cam so as to produce positive action in closing these valves, the two valves combined on one stem, operating in conjunction so as to admit constantly a definite quantity of air and gas, in the manner substantially and for the purposes specified.

4. In a gas engine, a superimposed shaft, connected to and driven by the engine crank shaft, and having tappets to operate the release valve, the igniting electrodes and admission valves for air and gas, the valves all set beneath the shaft in one vertical plane and opening directly into the main cylinder or an extension thereof, so that combustion will not extend beyond the cylinder or into passages thereto, in the manner substantially and for the purposes specified.

5. In a gas engine, two admission valves, one for gas and one for air and gas mingled, both attached to one stem and positively operated in closing, and held when shut by a shaft and cam, mounted on the main cylinder and directly over the valves, the valves so arranged that their respective areas determine the proportion of air and gas without the aid of cocks or adjustment, the second valve for air and gas mingled opening directly into the cylinder chamber, so that all the charge is burned in the cylinder under the same conditions, in the manner substantially and for the purposes described.

6. In a gas engine, a combustion chamber attached to the top of the main cylinder, provided with an annular recess to contain cooling fluid and having formed thereon hollow circular nipples integral therewith, to which are attached supports for a superimposed operating shaft, the nipples made hollow and answering also as inlets for air and gas and the escape of the burned product from the main cylinder, in the manner substantially as shown and described.

7. In a gas engine, a superimposed shaft provided with tappets and cams for operating the admission valves for gas and air and release of the spent gases, a centrifugal governor mounted loosely thereon, so as to be driven independently from the engine shaft, a sliding sleeve passing through one of the bearings of the shaft and operating a variable cam that controls the admission of gas and air, combined and operating in the manner substantially as herein described.

8. In a gas engine, a superimposed shaft mounted on the combustion chamber or main cylinder of the engine and connected and positively driven from the engine crank shaft, a centrifugal governor mounted loosely on said superposed shaft so as to be driven independently from the engine shaft, a sleeve passing through one of the bearings of the shaft and a cam operated by the governor and an opposing adjustable spring pressing on the cam and opposing thereby the centrifugal force of the governor so that the period or extent of admitting air and gas can be regulated by hand and at will, substantially as described.

9. In a gas engine, a combustion chamber having hollow nipples cast thereon, supporting brackets and an operating shaft mounted on this chamber, valves for gas, air and exhausting the engine, placed in line of the shaft, and operated thereby, electrodes for igniting the charge in the same line, and actuated by the same shaft, so that all operating parts for supply, release and combustion of gas and air in one vertical plane and operated in conjunction by one shaft, in the manner substantially and for the purposes specified.

10. In a gas engine, a superimposed operating shaft, connected and driven positively from the engine crank shaft, a movable cam thereon for operating the admission valves for gas and air, the cam surrounded by a yoke attached to the valve stem and having a roller at the top bearing on the cam, a tapering depression in the cam permitting the roller and yoke to descend and open the inlet valves in proportion as the cam is moved forward or back by the governor, in the manner substantially and for the purposes described.

11. In a gas engine, admission valves for gas and air attached to one stem, rigidly combined and admitting predetermined and fixed quantities of gas and air without cocks or other valves for regulating the same, a variable cam to partially close these admission valves and hold them shut when closed so that no inflammable gas can enter the engine when not required, in the manner substantially and for the purposes specified.

12. In a gas engine, the cam R and yoke T, and roller S, the latter cut away at $s$, and otherwise of a cylindrical contour, so that the yoke T will be held in its upward position until the roller S rests on the depression $s$ and permits the induction valves J and K to open, substantially in the manner and for the purposes specified.

In testimony whereof we have hereunto affixed our signatures in the presence of two witnesses.

CARL F. HIRSCH.
ADAM SCHILLING.

Witnesses.
ALFRED A. ENQUIST,
WILSON D. BENT, Jr.